United States Patent
Iwasaki et al.

(10) Patent No.: US 6,853,450 B1
(45) Date of Patent: Feb. 8, 2005

(54) MONOCHROMATOR AND OPTICAL SPECTRUM ANALYZER

(75) Inventors: Takashi Iwasaki, Tokyo (JP); Tomoichi Soeda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/578,962

(22) Filed: May 25, 2000

(30) Foreign Application Priority Data

May 27, 1999 (JP) ............................................ 11-148836

(51) Int. Cl.$^7$ ................................................. G01J 3/18
(52) U.S. Cl. ..................................................... 356/334
(58) Field of Search ................................. 356/300, 319, 356/326, 328, 331, 334; 359/846, 850

(56) References Cited

U.S. PATENT DOCUMENTS

| | | | | |
|---|---|---|---|---|
| 3,391,600 A | * | 7/1968 | Blumentritt et al. | 378/70 |
| 3,865,490 A | * | 2/1975 | Grossman | 356/302 |
| 4,254,335 A | * | 3/1981 | Tondello et al. | 356/483 |
| 4,559,277 A | * | 12/1985 | Ito | 428/627 |
| 4,675,860 A | * | 6/1987 | Laude et al. | 398/88 |
| 4,709,989 A | * | 12/1987 | Machler | 359/896 |
| 4,744,618 A | * | 5/1988 | Mahlein | 385/37 |
| 4,758,090 A | * | 7/1988 | Schuma | 356/326 |
| 5,166,747 A | * | 11/1992 | Schroeder et al. | 356/334 |
| 5,192,981 A | * | 3/1993 | Slutter et al. | 356/334 |
| 5,604,589 A | * | 2/1997 | Kraiczek | 356/328 |
| 5,712,705 A | * | 1/1998 | Fattinger et al. | 356/521 |
| 5,734,165 A | * | 3/1998 | Unal et al. | 250/338.1 |
| 5,754,290 A | * | 5/1998 | Rajic et al. | 356/328 |
| 6,118,583 A | * | 9/2000 | Rogers | 359/353 |
| 6,166,805 A | * | 12/2000 | Mori et al. | 356/334 |
| 6,219,473 B1 | * | 4/2001 | Laude | 385/24 |

FOREIGN PATENT DOCUMENTS

| | | |
|---|---|---|
| JP | 02054130 | 2/1990 |
| JP | 6-221922 | 8/1994 |
| JP | 8-292096 | * 11/1996 |
| JP | 2000-88647 | 3/2000 |

* cited by examiner

*Primary Examiner*—Zandra V. Smith
*Assistant Examiner*—Gordon J. Stock, Jr.
(74) *Attorney, Agent, or Firm*—Darby & Darby

(57) ABSTRACT

A monochromator comprises an optical ray input section which limits the width of optical rays input from a light source, a first concave mirror for converting the optical rays passing through the optical ray input section into parallel rays, a diffraction grating for separating the parallel rays by wavelength into diffracted rays, a second concave mirror for condensing the diffracted rays when the diffracted rays are input, an optical ray output section which limits a wavelength band width of the condensed rays, and a substrate to which the optical ray input section, the first concave mirror, the diffraction grating, the second concave mirror, and the optical ray output section are fixed. A coefficient of linear expansion of a focal length of the first concave mirror, a coefficient of linear expansion of a focal length of the second concave mirror, and a coefficient of linear expansion of a material forming the substrate in the monochromator are approximately the same.

13 Claims, 3 Drawing Sheets

PRIOR ART      Fig. 2

MONOCHROMATOR AND OPTICAL SPECTRUM ANALYZER

BACKGROUND OF THE INVENTION

1. Field of the Invention

The present invention relates to a monochromator which measures an optical spectrum property of a light source, and particularly, to a concave mirror for the monochromator and a material for a substrate.

This application is based on Japanese Patent Application No. Hei 11-148836, the contents of which are incorporated herein by reference.

2. Description of Related Art Including Information Disclosed Under 37 CFR 1.97 and 37 CFR 1.98

An optical spectrum analyzer comprising a conventional monochromator will be explained with reference to FIG. 2.

A light source 1 comprises various wavelengths and outputs optical rays to be measured as spectra, an input slit plate 2 limits the width of optical rays output from the light source 1, and a concave mirror 3 converts input rays passing through the input slit plate 2 into parallel rays. The length L1 between the input slit plate 2 and the concave mirror 3 is arranged to be equal to the focal distance of the concave mirror 3.

A diffraction grating 4 comprising numerous grooves thereon reflects the parallel rays and spatially separates the reflected rays by wavelength. The diffraction grating 4 is arranged on a stage 5 which is rotatable in the direction of D1 in FIG. 2 and rotates depending on the rotation of the stage 5 in the direction of D1.

A concave mirror 6 focuses only input rays spatially separated by wavelength by the diffraction grading 4 at the slit of an output slit plate 7. The output slit plate 7 limits the wavelength bandwidth of the optical rays which are focused at the slit of the output slit plate 7 by the concave mirror 6 and the length L2 between the slit of the output slit plate 7 and the concave mirror 6 is arranged to be equal to the focal length of the concave mirror 6. On the substrate 8, the incident slit 2, the concave mirror 3, the stage 5, the concave mirror 6, and the output slit plate 7 are fixed.

Furthermore, a monochromator 9 consists of the input slit plate 2, the concave mirror 3, the diffraction grating 4, the stage 5, the concave mirror 6, the output slit plate 7, and the substrate 8 and is called the Czerny-Turner dispersion type monochromator.

A photodetector 11 converts the intensity of the input rays which pass through the output slit plate 7 and are input to the photodetector 11, into electric signals proportional to the intensity. An amplifier 12 amplifies the electric signals output from the photodetector 11. An analog to digital converter (hereinafter called an A/D converter) 13 converts the electric signals which are amplified in the amplifier 12 into a digital signal.

A CPU (Central Processing Unit) 14 controls a driver 16, processes the digital signal which is output from the A/D converter 13, and outputs the processed digital signal to a display 15. When data is input from the CPU 14, the display 15 indicates the results of the measurement of the optical spectrum in response to data input from the CPU 14. The driver 16 controls the rotation of a rotation axis 18 of a motor 17 in response to a control signal output from the CPU 14. The motor 17 rotates the stage 5 and the diffraction grating 4 in the direction of D1 by rotating the rotation axis 18 in the direction of D2.

In the optical spectrum analyzer shown in FIG. 2, a spherical mirror or an off-axis parabolic mirror is used as the concave mirror 3 or 6. Furthermore, a stepping motor or a servomotor is used as the motor 17 for controlling the rotation of diffraction grating 4 and, for example, the rotational speed of the rotation axis 18 is decelerated using a worm gear or a sine bar so as to control the rotation of the diffraction grating 4 or the motor 17 is directly fixed to the rotation axis of the diffraction grating 4.

Next, movement of the optical spectrum analyzer shown in FIG. 2 will be explained.

When optical rays pass through the slit of the input slit plate 2 from the light source 1, the width of optical rays depends on the width of the slit of the input slit plate 2. When optical rays are input through the slit of the input slit plate 2, the concave mirror 3 converts the optical rays into parallel rays and outputs the parallel rays to the diffraction grating 4.

On the other hand, when the CPU 14 outputs the control signal into the driver 16, the driver 16 controls the motor 17 with the control signal and rotates the rotation axis 18 in the direction of D2. Rotating the rotation axis 18 in the direction of D2, the stage 5 rotates in the direction of D1 and the angle of the diffraction grating 4 arranged on the stage 5 changes depending on the rotation of the stage 5. According to the angle of the diffraction grating 4, the wavelength of the optical rays passing through the slit of the output slit plate 7 can be adjusted.

When the parallel rays which have been made parallel converted by the concave mirror 3 are input to the diffraction grating 4, only optical rays having specific wavelengths which depend on the angle of the diffraction grating 4 are output to the concave mirror 6 as diffracted rays. The concave mirror 6 focuses the diffracted rays on the output slit plate 7 when the diffracted rays are input from the diffraction grating 4. The slit of the output slit plate 7 limits the wavelength band of the optical rays when the optical rays are input through the slit of the output slit plate 7 from the concave mirror 6.

When the optical rays passing through the slit of the output plate 7 are input into the photodetector 11, the photodetector 11 converts the input rays into the electric signals proportional to the intensity of the input rays and outputs the electric signals to the amplifier 12. When the electric signals are input from the photodetector 11 to the amplifier 12, the amplifier 12 amplifies the electric signals so as to provide a proper voltage for inputting the electric signals to the A/D converter 13 and outputs to the electric signals to the A/D converter 13. When the amplified electric signals are input to the A/D converter 13, the A/D converter 13 converts the amplified electric signals into digital signals.

When the digital signals are input from the A/D converter 13 to the CPU 14, the wavelength passing through the slit of the output slit plate 7 is swept and changed from the specific wavelength at which the measurement starts to the specific wavelength at which the measurement ends and the wavelength-light intensity plot is shown as an optical spectrum on the display 15.

In optical spectrum analyzers, an important performance index is the wavelength resolution. In order to increase the wavelength resolution, it is required that focal lengths L1 and L2 of the concave mirrors 3 and 6 be as long as possible and the width d of the slit of the output slit plate 7 be as narrow as possible. As a preferable example, the focal length of the concave mirrors 3 and 6 is 280 mm and the minimum width of the slit of the output slit plate 7 is 15 $\mu$m.

Furthermore, the width of the optical rays focused on the output slit plate 7 must be narrower than the width of the slit of the output slit plate 7.

As shown in FIG. 2, the material for the substrate 8 is usually aluminum because it is lightweight and easily worked. The coefficient of linear expansion per unit length (m) of aluminum is high, i.e., $23 \times 10^{-6}/°$ C., so that the length L1 between the input slit plate 2 and the concave mirror 3 and the length L2 between the output slit plate 7 and the concave mirror 6 change depending on the ambient temperature. For example, when the length L1 between the input slit plate 2 and the concave mirror 3 and the length L2 between the output slit plate 7 and the concave mirror 6 are respectively 280 mm, the temperature coefficient of each length L1 and L2 is 6.4 $\mu$m/° C. (=$23 \times 10^{-6}/°$ C.$\times$280 mm).

Furthermore, the concave mirrors 3 and 6 are generally made of heat-resistant glass, for example, Pyrex glass. Generally, since the coefficient of linear expansion of the focal length of a concave mirror is equal to that of the material of the concave mirror, when the concave mirror is made of Pyrex glass, the coefficient of linear expansion per unit length (m) of the focal length of the concave mirror is $2.8 \times 10^{-6}/°$ C. which is equal to the coefficient of linear expansion of Pyrex glass. When the focal length of the concave mirror is 280 mm, the temperature coefficient of the focal length is no more than 0.8 $\mu$m/° C. (=$2.8 \times 10^{-6}/°$ C.$\times$280 mm). The difference between the temperature coefficient of each length L1 and L2 and that of the Pyrex glass is 5.6 $\mu$m/° C. (=6.4 $\mu$m/° C.$-$0.8 $\mu$m/° C.).

Therefore, if the ambient temperature when operating the monochromator 9 is 10° C. higher than the ambient temperature when assembling the monochromator 9, the length L1 is 56 $\mu$m longer than the focal length of the concave mirror 3. Similarly, the length L2 is 56 $\mu$m longer that the focal length of the concave mirror 6, so that the optical rays reflected from the concave mirror 6 focus about 112 $\mu$m too far from the surface of the output slit plate 7.

When the coefficient of linear expansion of the substrate 8 is K1, the coefficient of linear expansion of focal length of the concave mirrors 3 and 6 is K2, the focal length of each concave mirror 3 and 6 when the assembling the monochromator 9 is L, and the difference between the ambient temperature when operating the monochromator 9 and the ambient temperature when assembling the monochromator 9 is $\Delta$T, and the difference between the focal point of the optical rays output from the concave mirror 6 and the position of the output slit plate 7 is $\Delta$L, the relation between these is as follows.

$$\Delta L = |(K1-K2) \times 2L \Delta T| \quad (1)$$

Furthermore, when the numerical aperture of each concave mirror 3 and 6 is a and the width of the optical rays focused on the output slit plate 7 is x, the following relational holds.

$$x = |\Delta L| \times 2a \quad (2)$$

If the numerical aperture a of each concave mirror 3 and 6 is 0.1, the width of the optical rays x focused on the output slit plate 7 is 22.4 $\mu$m, which is calculated by multiplying 112 $\mu$m and twice the numerical aperture using formulas (1) and (2). If the width of the slit of the output slit plate 7 is 15 $\mu$m, the width of the optical rays focused on the output slit plate 7 is wider than the width of the slit of the output slit plate 7, so that the wavelength selectivity of the output slit plate 7 decreases, the wavelength resolution deteriorates, and further, the output level decreases.

On the other hand, when the width of the optical rays focused on the output slit plate 7 is 15 $\mu$m in the monochromator 9, the difference between the ambient temperature when operating the monochromator and the ambient temperature when assembling the monochromator 9 is $\pm$6.7° C. by calculating using formulas (1) and (2). According to this example, the usable temperature range of the monochromator or the optical spectrum analyzer is only $\pm$6.7° C. from the temperature when assembling the monochromator 9. Since it is quite conceivable for the ambient temperature to vary from 10 to 35° C. in a general working environment, the optical spectrum analyzer according to this example cannot perform sufficiently over this temperature range.

Recently, in the field of optical communication, an optical spectrum analyzer using a double-pass monochromator disclosed in Japanese Unexamined Patent Application, First Publication, No. Hei 6-221922 (hereinafter called JP 6-221922) or Japanese Unexamined Patent Application, First Publication, No. 2000-88647 (hereinafter called JP 2000-88647) has been used. When a double-pass monochromator is used, since optical rays are reciprocated in the monochromator, the difference between the slit and the practical focal point is twice that of the above example.

Conventionally, the coefficient of linear expansion of the material is reduced as low as possible, however, an example using the difference between the coefficient of linear expansion of each material of the substrate and the concave mirror has not been note.

BRIEF SUMMARY OF THE INVENTION

In the light of the above problems, the object of the present invention is to provide a monochromator and an optical spectrum analyzer so that the resolving power of the wavelengths is satisfactorily preserved even if the ambient temperature around the monochromator is changed, since a material having small coefficient of linear expansion is used as a substrate to which an input slit plate, a concave mirror, and an output slit plate are fixed, while a material having relatively large coefficient of linear expansion is used as the concave mirror and both coefficients of linear expansion are approximately the same.

To achieve the above object, the first embodiment of the present invention is a monochromator comprising: an optical ray input section which limits the width of optical rays input from a light source, a first concave mirror for converting the optical rays passing through the optical ray input section into parallel rays, a diffraction grating for separating the parallel rays by wavelength into diffracted rays, a second concave mirror for condensing the diffracted rays when the diffracted rays are input, an optical ray output section which limits a wavelength band width of the condensed rays, and a substrate to which the optical ray input section, the first concave mirror, the diffraction grating, the second concave mirror, and the optical ray output section are fixed; wherein a coefficient of linear expansion of a focal length of the first concave mirror, a coefficient of linear expansion of a focal length of the second concave mirror, and a coefficient of linear expansion of a material forming the substrate are approximately the same.

Furthermore, when a width of the optical ray output section is d, a focal length of each of the first and second concave mirrors when assembling the monochromator is L, a difference between an ambient temperature when operating the monochromator and the temperature when assembling the monochromator is $\Delta$T, and a numerical aperture of the concave mirror is a, the absolute value of a difference between the coefficient of linear expansion of the material forming the substrate and the coefficients of linear expansion of the material of the first and second concave mirrors may be the absolute value of d/(4aLΔT) or less.

Furthermore, a difference between the coefficient of linear expansion of the material forming the substrate and the coefficients of linear expansion of the focal lengths of the first and second concave mirrors may be $10 \times 10^{-6}/°$ C. or less.

Furthermore, the material forming the substrate may be a composite of aluminum and ceramic.

And further, at least one of the optical ray input section and the optical ray output section may be a slit.

The second embodiment of the present invention is a monochromator comprising: a slit to limit a width of optical rays input from a light source, a concave mirror to convert the optical rays passing through the slit into parallel rays, a diffraction grating to separate the parallel rays into diffracted rays by wavelength, and a substrate to which the slit, the concave mirror, and the diffraction grating are fixed; wherein the concave mirror condenses the diffracted rays when the diffracted rays are input, and the slit limits a wavelength band width of the condensed rays; wherein a coefficient of linear expansion of a focal length of the concave mirror and a coefficient of linear expansion of a material forming the substrate are approximately the same.

Furthermore, a difference between the coefficient of linear expansion of the material forming the substrate and the coefficient of linear expansion of the focal length of the concave mirror may be $10 \times 10^{-6}/°$ C. or less.

Furthermore, the material forming the substrate may be a composite of aluminum and ceramic.

The third embodiment of the present invention is an optical spectrum analyzer comprising any one of the above monochromators.

According to the first and second embodiments, even if the ambient temperature around the monochromator changes from the temperature when assembling the monochromator, a monochromator which satisfactorily preserves the resolving power of wavelengths is obtained.

Furthermore, since the difference between the coefficient of linear expansion of the material forming the substrate and the coefficients of the linear expansion of the focal lengths of the first and second concave mirrors is very small, the width of the optical rays which pass through the optical ray output section is narrow and the monochromator which satisfactorily preserves the resolving power of wavelengths is obtained.

Moreover, since the material forming the substrate is a composite of aluminum and ceramic, its coefficient of linear expansion is smaller than the coefficient of linear expansion of an aluminum material forming the substrate.

According to the third embodiment, since the monochromator according to the first or second embodiment is used, the wavelength-light intensity is satisfactorily measured.

DETAILED DESCRIPTION OF THE INVENTION

Figure 1:
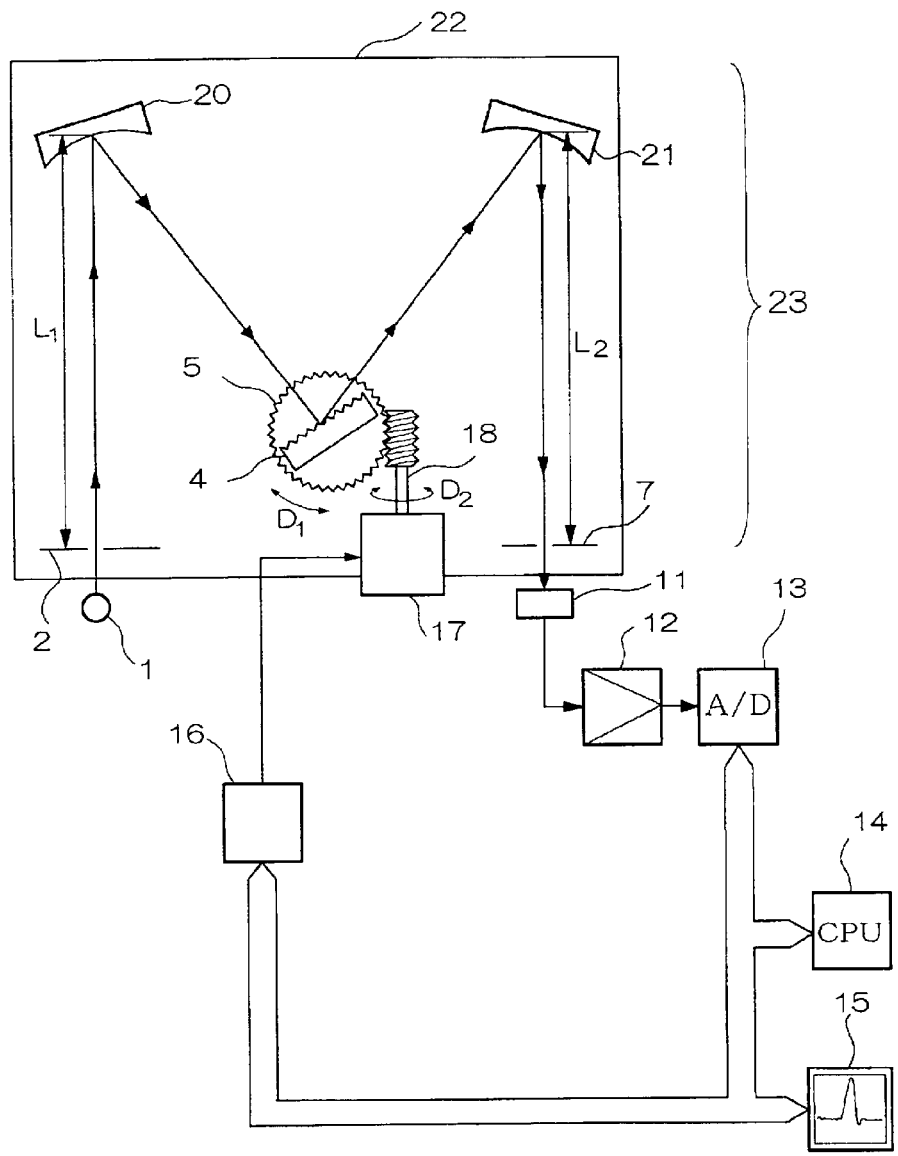
FIG. 1 is a block diagram showing a structure of a first embodiment according to the present invention.

FIG. 1 is a block diagram showing the structure of the first embodiment of the present invention.

Figure 2:
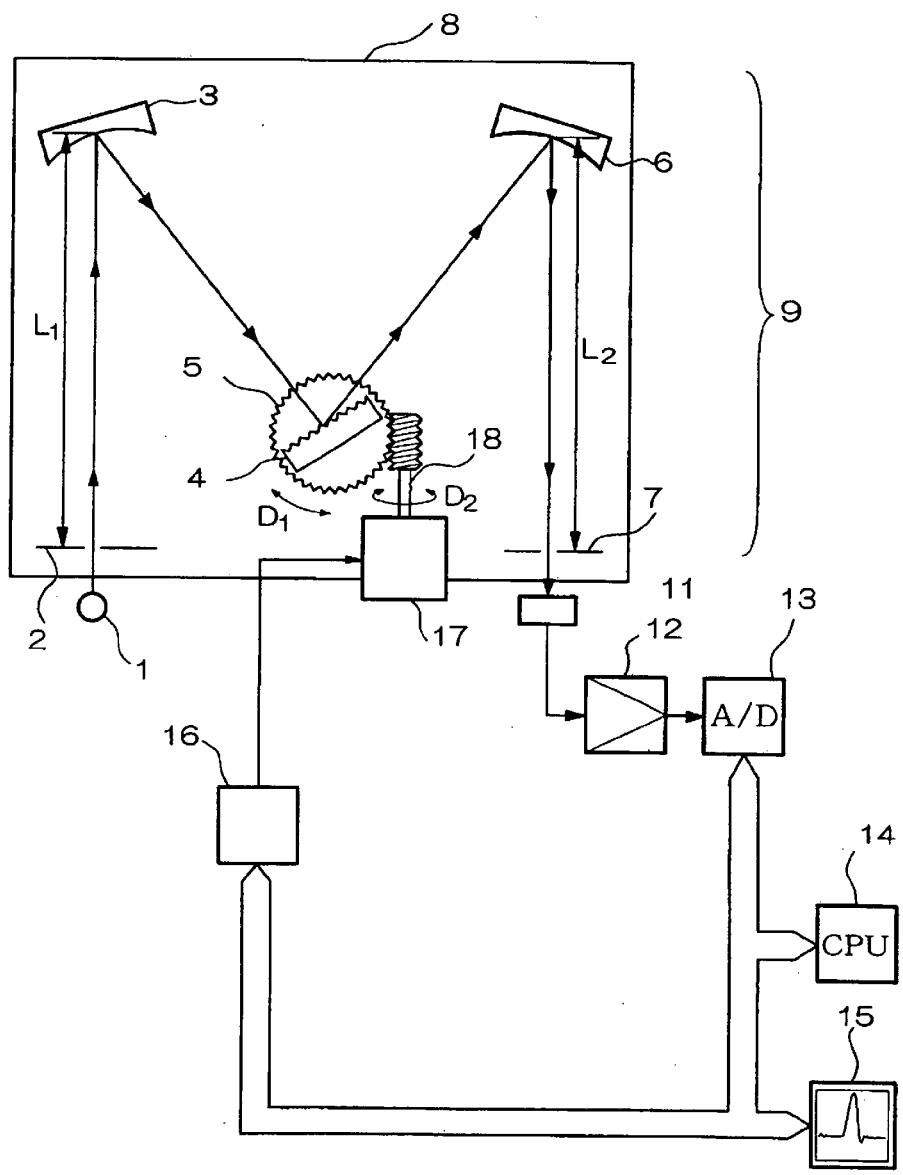
FIG. 2 is a block diagram showing a structure of an optical spectrum analyzer using conventional monochromator.

Parts shown in FIG. 1 corresponding to parts shown in FIG. 2 are given the same numerals, and their explanations are omitted. Different parts are explained as follows.

Concave mirrors 20 and 21 are formed of sodium carbonate glass. Each focal length is 280 mm and the coefficient of linear expansion per unit of length (m) is $9 \times 10^{-6}/°$ C. which is the same as the coefficient of linear expansion of the sodium carbonate glass. The substrate 22 has a coefficient of linear expansion per unit of length (m) of $15 \times 10{-6}/°$ C. and is formed of a material comprising aluminum mixed with ceramic.

A monochromator 23 comprising an input slit plate 2, the concave mirror 20, a diffraction grating 4, a stage 5, the concave mirror 21, an output slit plate 7, and the substrate 22, is called a Czerny-Turner dispersion type monochromator. When the length L1 between the input slit plate 2 and the concave mirror 20 and the light L2 between the concave mirror 21 and the output slit plate 7 are respectively 280 mm, the temperature coefficient of each length L1 and L2 is 4.2 $\mu$m/° C. (=$15 \times 10^{-6}/°$ C.$\times 250$ mm) and the temperature coefficient of each focal length of the concave mirrors 20 and 21 is 2.5 $\mu$m/° C. (=$9 \times 10{-6}/°$ C.$\times 280$ mm), so that the difference between the above coefficients is 1.7 $\mu$m/° C. (=4.2 $\mu$m/° C.$-$2.5 $\mu$m/° C.).

When the ambient temperature when operating the monochromator 23 increases 10° C. above the ambient temperature when assembling the monochromator 23, calculations using the formula (1) show that the optical rays condensed by the concave mirror 21 focus about 34 $\mu$m (=|(4.2 $\mu$m/° C.$-$2.5 $\mu$m/° C.)$\times 2 \times 10°$ C.|) short of the surface of the output slit plate 7. The width of optical rays which are focused on the output slit plate 7 is found to be 6.8 $\mu$m (=34 $\mu$m$\times 2 \times 0.1$) by calculating using formulas (1) and (2) when the numerical aperture of each of the concave mirrors is 0.1. However, since the width of optical rays is sufficiently narrower than 15 $\mu$m which is the minimum width of the slit of the output slit plate 7, the wavelength resolution of the monochromator is not deteriorated.

On the other hand, since the difference between the ambient temperature when operating the monochromator 23 and the ambient temperature when assembling the monochromator 23 is $\pm 22.0°$ C. when the width of optical rays which are focused on the output slit plate 7 is 15 $\mu$m, the usable temperature range of the optical spectrum analyzer shown in FIG. 1 is $\pm 22.0°$ C. from the ambient temperature when assembling the monochromator 23. Therefore, the monochromator shows sufficient performance under ordinary working environments.

The width of the optical rays projected on the output slit plate 7 should be less than the width of the slit of the output slit plate 7, using the formulas (1) and (2) and the coefficient of linear expansion K1 of the substrate 22, the coefficient of linear expansion K2 of the focal lengths of each of the concave mirrors 20 and 21, the numerical aperture a of each of concave mirrors 20 and 21, the width d of the slit of the output slit plate 7, and the focal length L of each of concave mirrors 20 and 21 when the monochromator 23 is assembled, and the difference ΔT between the ambient temperature when operating the monochromator 23 and the ambient temperature when assembling the monochromator 23; an expression relating these is as follows.

$$|K1 - K2| \leq \left| \frac{d}{4aL\Delta T} \right|$$

In this embodiment, the material of the concave mirrors 20 and 21 is sodium carbonate glass and the material of the substrate 22 is a composite of aluminum mixed with ceramic, however, the present invention can be carried out by combining other materials. For example, if the concave mirrors 20, and 21 are made of BK7 (a glass) and the substrate 22 is made of stainless steel or iron, the difference between coefficients of linear expansion of these materials is reduced. Practically, if the difference between coefficients of linear expansion of these materials is $10 \times 10^{-6}/°$ C. or less, sufficient wavelength resolution is obtained even if the ambient temperature changes.

Furthermore, though the input slit plate 2 is used as an optical ray input section in the embodiment, optical rays from the light source 1 may be projected through an optical fiber to the monochromator 23. In this case, since the end of the optical fiber performs as the input slit plate 2, the input slit plate 2 may be omitted.

Figure 3:
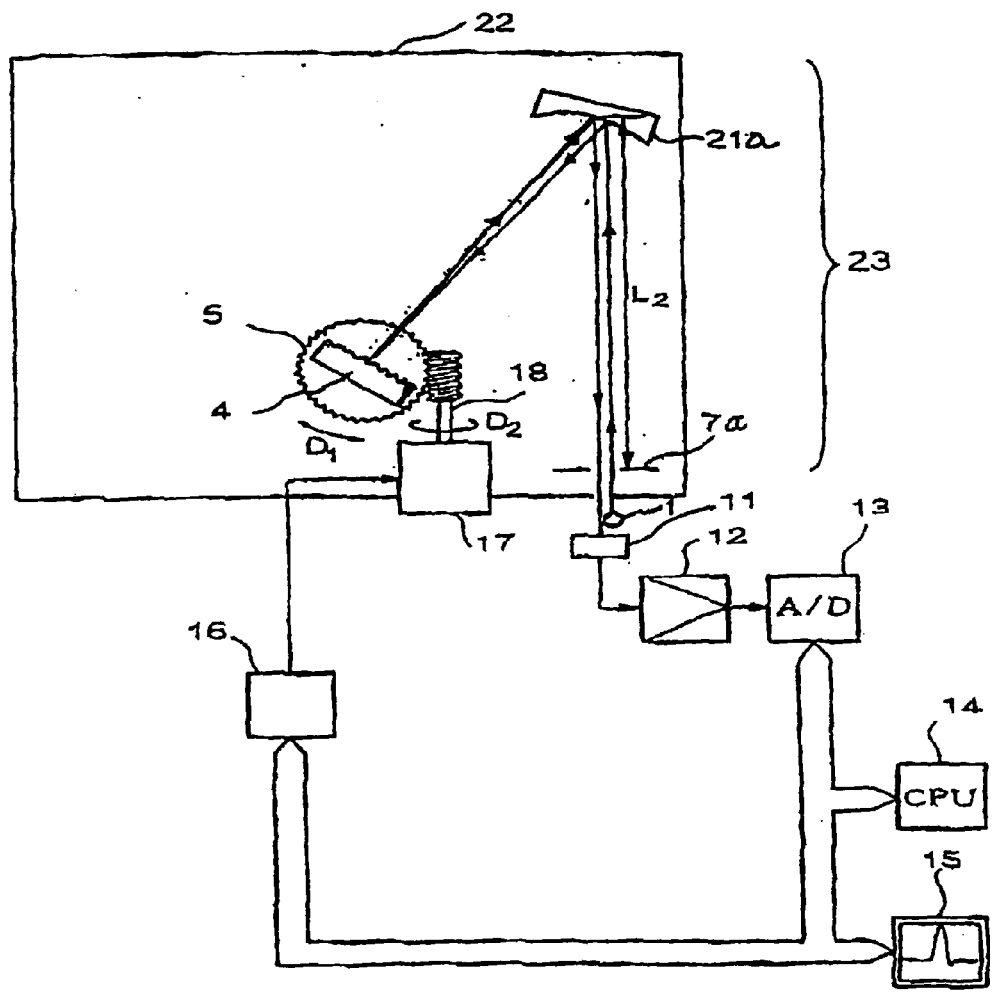
FIG. 3 is a block diagram showing a structure of a second embodiment according to the present invention.

Moreover, as shown in FIG. 3, in a second embodiment, a single concave mirror 21a may be used instead of the two concave mirrors 20 and 21 of FIG. 1. The single concave mirror 21a condenses optical rays from the light source 1 and outputs to the diffraction grating 4, and further inputs the optical rays from the diffraction grating and outputs the optical rays to the output slit plate 7a. Here, the input slit and the output slit are the same.

The substrate 22 shown in FIG. 1 is a plate, however, its shape is not limited to a plate. The substrate 22 may comprise a concavo-convex shape to support attaching parts on the substrate 22 and may consist of plural parts.

Furthermore, the components of the monochromator of the present invention can be applied to the double-pass monochromator in JP 6-221922 or JP 2000-88647.

The present invention may be embodied in other forms without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A monochromator comprising:
    an optical ray input section which limits the width of optical rays input from a light source,
    a first concave mirror for converting the optical rays passing through the optical ray input section into parallel rays,
    a diffraction grating for separating the parallel rays by wavelength into diffracted rays,
    a second concave mirror for condensing the diffracted rays when the diffracted rays are input,
    an optical ray output section which limits a wavelength band width of the condensed rays, and
    a substrate to which all of the optical ray input section, the first concave mirror, the diffraction grating, the second concave mirror, and the optical ray output section are fixed;
    wherein the first and second concave mirrors are formed of a first material and said substrate is formed of a second material different from said first material, a coefficient of linear expansion of a focal length of the first concave mirror, a coefficient of linear expansion of a focal length of the second concave mirror, and a coefficient of linear expansion of the second material forming the substrate are approximately the same.

2. The monochromator according to claim 1, wherein at least one of the optical ray input section and the optical ray output section is a slit.

3. An optical spectrum analyzer comprising:
    the monochromator according to claim 1 and further comprising:
    a photodetector to receive the light ray output of the optical ray output section; and
    display means connected to the photodetector for displaying the light ray output detected by the photodetector.

4. The monochromator according to claim 1 wherein the first and second concave mirrors are of glass material.

5. The monochromator according to claim 4, wherein the material forming the substrate is a composite of aluminum and ceramic.

6. The monochromator according to claim 1, wherein the substrate is formed at least in part of metal.

7. A monochromator comprising:
    a slit to limit a width of optical rays input from a light source,
    a concave mirror to convert the optical rays passing through the slit into parallel rays,
    a diffraction grating to separate the parallel rays into diffracted rays by wavelength, and
    a substrate to which all of the slit, the concave mirror, and the diffraction grating are fixed;
    wherein the concave mirror condenses the diffracted rays when the diffracted rays are input, and the slit limits a wavelength band width of the condensed rays;
        wherein a coefficient of linear expansion of a focal length of the concave mirror and a coefficient of linear expansion of a material forming the substrate are approximately the same.

8. The monochromator according to claim 7, wherein the material forming the substrate is a composite of aluminum and ceramic.

9. An optical spectrum analyzer comprising:
    the monochromator according to claim 7, and further comprising:
    a photodetector to receive optical ray output from the slit; and
    means connected to the photodetector for displaying the optical ray output detected by the photodetector.

10. The monochromator according to claim 7, wherein the concave mirror is of glass material.

11. The monochromator according to claim 7, wherein the substrate is formed at least in part of metal.

12. A monochromator comprising:
    an optical ray input section which limits the width of optical rays input from a light source,
    a first concave mirror for converting the optical rays passing through the optical ray input section into parallel rays,
    a diffraction grating for separating the parallel rays by wavelength into diffracted rays,
    a second concave mirror for condensing the diffracted rays when the diffracted rays are input,
    an optical ray output section which limits a wavelength band width of the condensed rays, and
    a substrate formed of a composite of aluminum and ceramic to which all of the optical ray input section, the first concave mirror, the diffraction grating, the second concave mirror, and the optical ray output section are fixed;
    wherein a coefficient of linear expansion of a focal length of the first concave mirror, a coefficient of linear expansion of a focal length of the second concave mirror, and a coefficient of linear expansion of the composite of aluminum and ceramic forming the substrate are approximately the same.

13. A monochromator comprising:

a slit for liming a width of optical rays input from a light source, a concave mirror for converting the optical rays passing through the slit into parallel rays, a diffraction grating for separating the parallel rays by wavelength into diffracted rays, a substrate formed of a composite of aluminum and ceramic to which all of the slit, the concave mirror, and the diffraction grating fixed; and wherein the concave mirror condenses the diffracted rays when the diffracted rays are input, and the slit limits a wavelength band width of the condensed rays;

wherein the concave mirror is of glass material;

wherein a coefficient of linear expansion of a focal length of the concave mirror and a coefficient of linear expansion of the composite of aluminum and ceramic forming the substrate are approximately the same.

* * * * *